United States Patent [19]

Malloy

[11] 4,138,003
[45] Feb. 6, 1979

[54] VIBRATION DAMPER FOR A TORQUE CONVERTER LOCK-UP CLUTCH

[75] Inventor: John D. Malloy, Troy, Mich.
[73] Assignee: General Motors Corporation, Detroit, Mich.
[21] Appl. No.: 823,938
[22] Filed: Aug. 12, 1977
[51] Int. Cl.² ............................................. F16D 3/66
[52] U.S. Cl. ........................... 192/3.29; 64/27 B; 64/27 C; 64/27 L; 192/106.1; 192/106.2
[58] Field of Search ............... 192/3.29, 3.3, 70.17, 192/70.18, 106.1, 106.2; 64/27 B, 27 C, 27 L

[56] References Cited

U.S. PATENT DOCUMENTS

| | | | |
|---|---|---|---|
| 1,978,922 | 10/1934 | Wemp | 192/70.17 X |
| 2,507,999 | 5/1950 | Schjolin | 192/70.18 |
| 3,159,987 | 12/1964 | Thompson et al. | 64/27 B |
| 3,800,931 | 4/1974 | Maucher | 192/106.2 |
| 4,024,938 | 5/1977 | Maucher | 192/106.2 |
| 4,027,757 | 6/1977 | Radke et al. | 192/106.2 |

*Primary Examiner*—Allan D. Herrmann
*Attorney, Agent, or Firm*—Donald F. Scherer

[57] ABSTRACT

A vibration damper for a torque converter lock-up clutch wherein a wide angle of relative movement between the input and output members of the clutch is provided. The damper has radially spaced, staged resilient members disposed in parallel torque transmitting relation between stages in a manner to permit the primary stage only to transmit torque during a predetermined amount of relative angular movement and permit the secondary stage to pick up torque transmission for further predetermined relative angular movements.

3 Claims, 8 Drawing Figures

VIBRATION DAMPER FOR A TORQUE CONVERTER LOCK-UP CLUTCH

This invention relates to torsional vibration dampers and more particularly to torsional vibration dampers having a wide angle of relative movement during the damping process.

Prior art dampers which permit wide angle relative movement are primarily of the type wherein the springs are disposed in series torque transmission arrangement between the input and output member of the clutch to which they are attached. These devices have some limitations as to the spring rate which can be utilized in these devices. The present invention permits the use of spring rates which are more readily acceptable for use in a torque converter lock-up clutch wherein vibration dampening must be more complete to provide the smoothness associated with a torque converter type drive.

It is therefore an object of this invention to provide an improved torsional vibration damper having a wide angle of relative motion for damping the torsional vibrations in a torque converter lock-up clutch.

Another object of this invention is to provide an improved clutch torsional vibration damper having a wide angle of relative motion wherein a primary stage spring transmits torque through a first angle of relative motion between the clutch input and output and a secondary stage spring picks up the torque transmission to assist the primary stage for wider angles of relative motion.

A further object of this invention is to provide an improved torsional vibration damper having a wide angle of relative motion between the input and output members for dampening torsional vibrations in a torque converter lock-up clutch wherein a primary stage compression spring disposed adjacent the outer periphery of the clutch plate and the torque converter transmits torque from the clutch to the torque converter turbine for a predetermined amount of relative angular motion and a secondary stage spring spaced radially inward from the primary stage, transmits torque only after the predetermined relative angular motion between the clutch and turbine has occurred.

These and other objects and advantages of the present invention will be more apparent from the following description and drawings in which.

Figure 1:
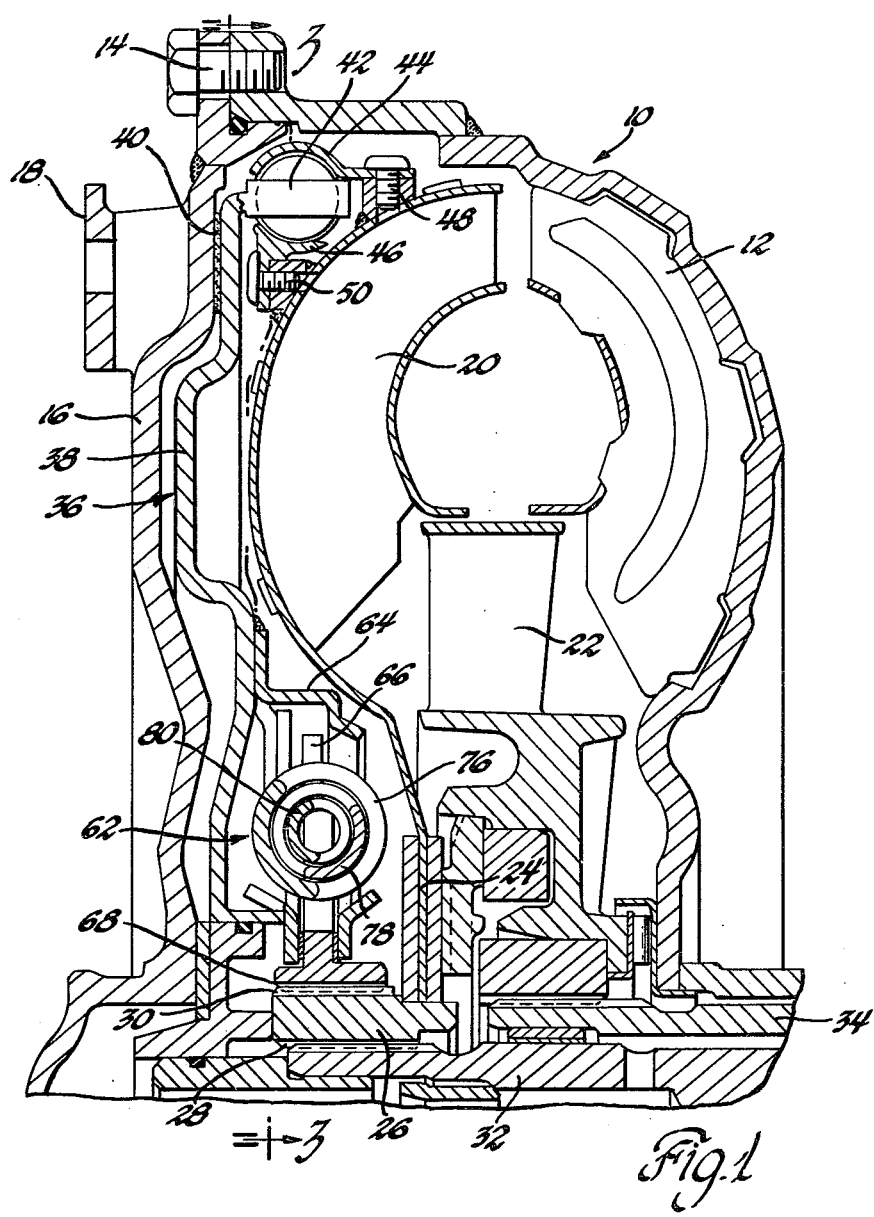
FIG. 1 is a cross-sectional side elevational view of a torque converter and lock-up clutch incorporating a vibration damper.
Figure 3:
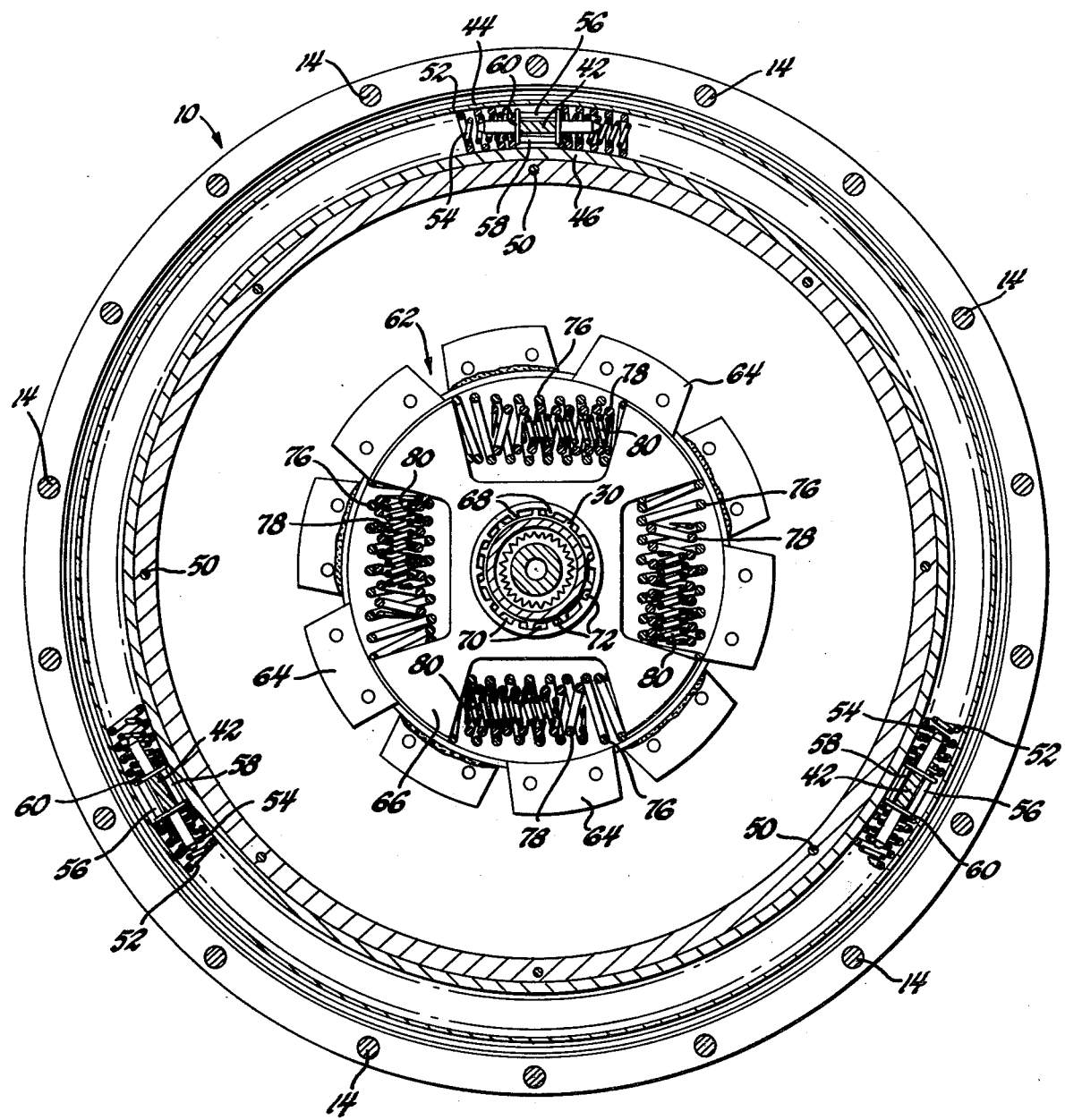
FIG. 3 is a view partially in section taken along line 3—3 of FIG. 1.

Referring to FIGS. 1 and 3 there is seen a torque converter, generally designated 10, having an impeller member 12 which is secured by fasteners such as bolt 14 to an input shell 16 which is adapted to be connected to an internal combustion engine, not shown, through a connecting portion 18. The torque converter 10 also has a turbine 20 and a stator 22. The turbine 20 is connected at its inner hub 24 to a drive portion 26 having splines 28 and 30. The splines 28 are drivingly connected to a torque converter output shaft 32 which in turn may be connected to a conventional automatic type multi-speed planetary transmission. The stator 22 is connected to the shaft 34 which in turn is grounded through a one way device, not shown, to the transmission housing.

The torque converter 10 functions in a conventional manner, that is the impeller 12 is driven by an engine and in turn, because of the distribution of fluid through the torque converter, the turbine 20 is rotated in the same direction as the impeller 12 and thereby causes rotation of the torque converter output shaft 32. As is well known in torque converters, the turbine lags behind or slips relative to the impeller depending on the amount of torque being transmitted and the torque capacity of the torque converter. This lag or slipping of the torque converter is an efficiency loss within the system. In many situations it has been proposed to eliminate the slippage loss in the torque converter by utilizing a lock-up clutch which functionally causes the turbine and impeller to rotate in unison and thereby transmits a drive torque through the clutch when it is engaged relieving the load on the torque converter. The use of a lock-up clutch requires that a vibration dampener be used to eliminate the engine torsional vibration which would be transmitted through the clutch. A torsional vibration damper is not necessary for the torque converter, as is well known, because the fluid drive connection through the torque converter dampens the torsional vibrations within the torque converter.

A lock-up clutch generally designated 36, is incorporated within the torque converter shell. This clutch includes a pressure plate 38 which has secured thereto a friction surface 40 adapted to frictionally engage the input shell 16 and thereby create a friction drive connection between the engine and the pressure plate 38 of clutch 36. The pressure plate 38 has formed at its outer periphery a plurality of fingers 42 which are disposed intermediate a pair of spring retainers 44 and 46 secured to the turbine 20 by fasteners 48 and 50 respectively. The spring retainers 44 and 46 as can be seen in FIG. 3 provide a housing in which are located three pairs of coil springs, 52 and 54. The spring retainer 44 has three indented portions 56 spaced equally around the periphery and the retainer 46 has three indented portions 58 spaced around the retainer. There are three fingers 42 connected to the clutch plate 38, these fingers 42 also are spaced equally around the periphery. As can be seen in FIG. 3 the springs 52 and 54 have at each end thereof a spring seat 60 which when in the assembled position abut the indented portions 56 and 58 and the fingers 42. When the clutch is engaged in a well known manner, such as by fluid pressure, the torque transmission through the clutch plate 38 will cause relative movement between clutch plate 38, and therefore the fingers 42, and the turbine 20, and therefore the indented portions 56 and 58, such that the springs 52 and 54 will be compressed at a rate determined by the spring rate and the amount of torque transmitted.

The lock-up clutch 36 has disposed radially inward from the fingers 42, a second damper generally designated 62. The second damper 62 has a spring housing 64 secured to the clutch plate 38 and a hub 66 which has formed on the inner periphery thereof a spline portion 68. The spline portion 68 is placed in interdigital relation with the spline portion 30. As can be seen in FIG. 3 there is angular spaces 70 and 72 formed between the teeth of spline 68 and 30. These angular spaces permit relative movement between the spline teeth before a drive connection between the damper 62 and the shaft 32 is completed. This space permits the springs 52 and 54 to provide the primary damping of the clutch such that the relationship of torque transmission and angular travel of the clutch is along a path such as 74 in FIG. 2.

Figure 2:
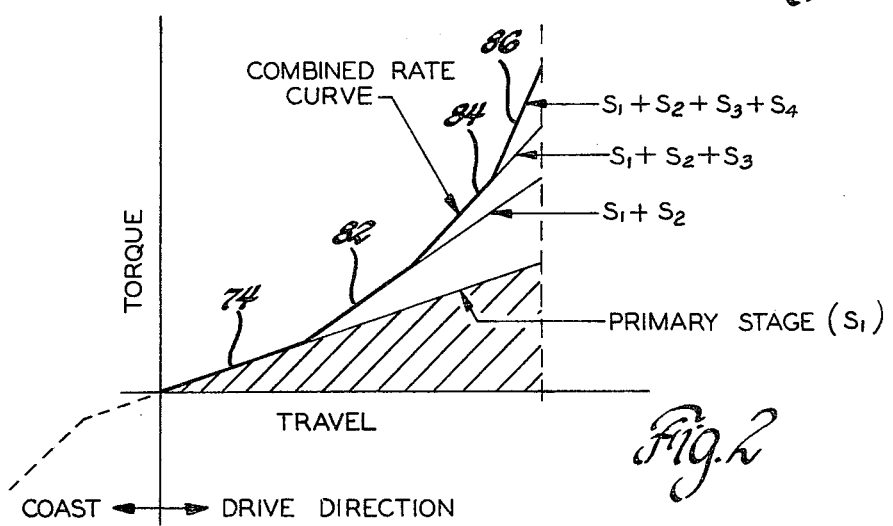
FIG. 2 is a curve depicting the torque transmission and angular travel relationship of the vibration damper.

The damper 62 also includes four sets of three nested springs 76, 78 and 80 which are trapped between the spring housing 64 and the hub 66. When the angular space 70, which is the forward direction relative movement, is closed the damper 62 will assist the damper formed by springs 52 and 54 in transmitting the torque. During the initial phase of the second stage of dampening, the spring 76 will cause an increase in the torque transmission relative to angular deflection as shown in FIG. 2 at line 82. As can be seen in FIG. 3 the nested springs will pick up individually after a predetermined amount of angular movement has occurred such that when springs 78 pick up the curve line will be adjusted to line 84 shown in FIG. 2, and when springs 80 pick up the curve will be adjusted to line 86 as shown in FIG. 2. Thus it is seen that a substantially smooth and increasing type curve is generated for the relationship between torque transmission and angular travel of the clutch damper. It has been found that angular travel of greater than 45° with torque transmissions of 250 ft. lbs. can be accomplished with this type of damping arrangement. During coasting of the vehicle with the clutch engaged there is the need for damping also. In the coast direction however it is desireable to permit less limited excursion of the clutch components before pick up of the secondary stage of damping occurs. Thus the space 72 is made much smaller than the space 70 such that the primary springs 52 and 54 will undergo less compression before the secondary damping springs 76 come into play.

Figure 4:
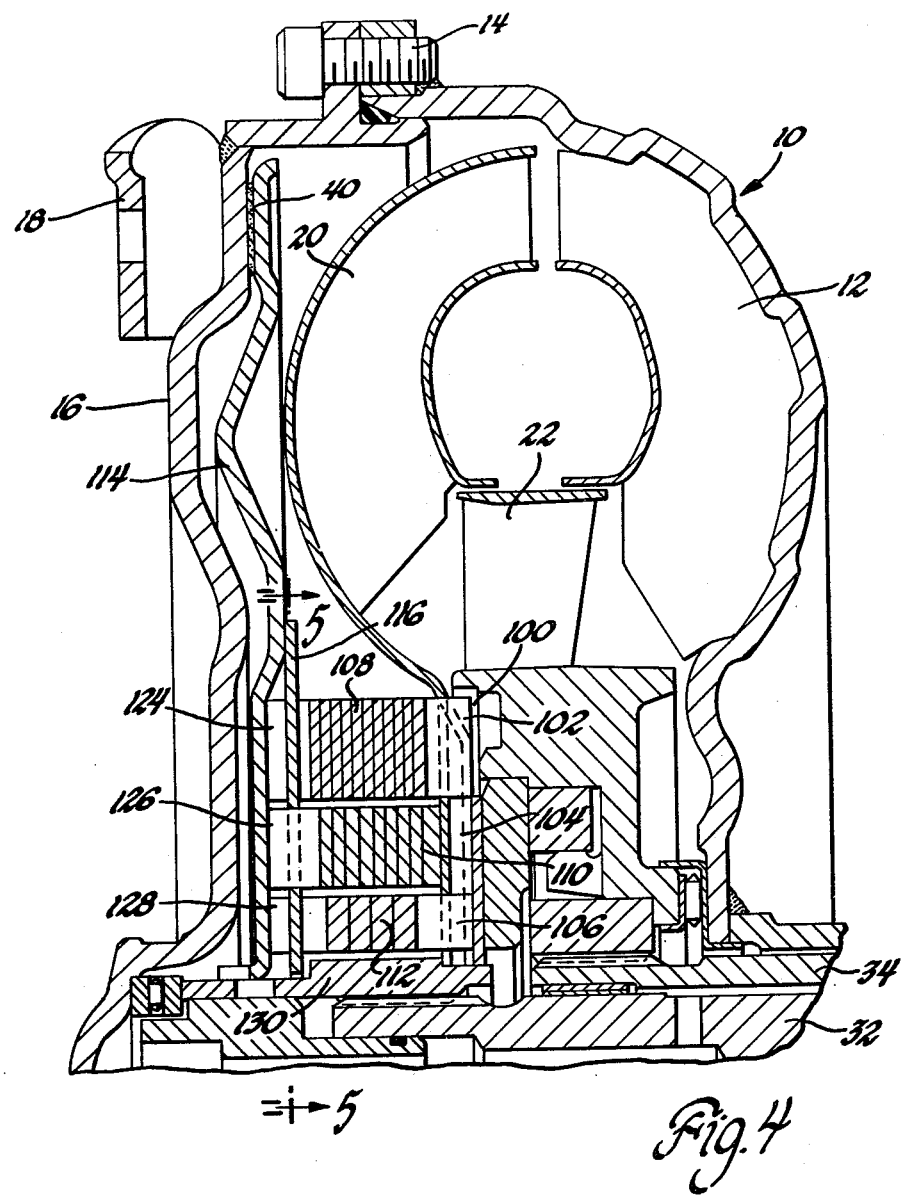
FIG. 4 is a cross-sectional side elevational view of another embodiment of the vibration damper.
Figure 5:
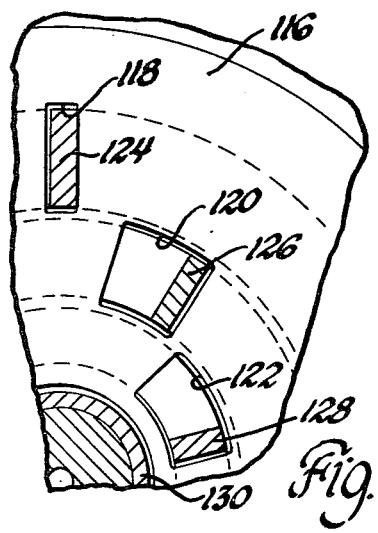
FIG. 5 is a view taken along line 5—5 of FIG. 4.
Figure 6:
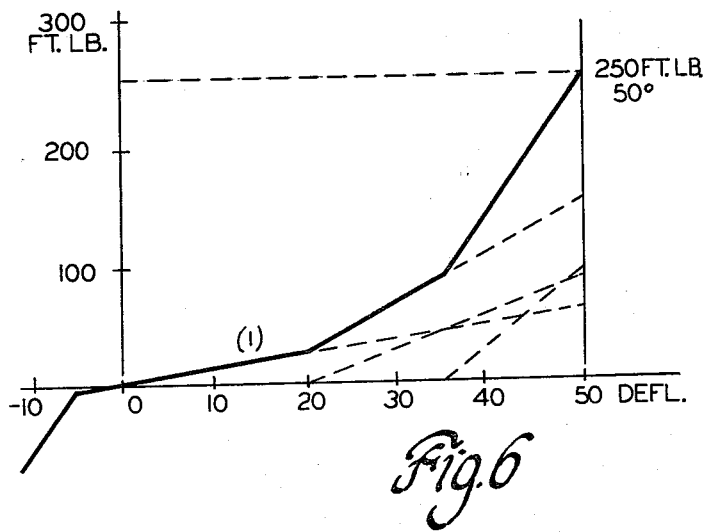
FIG. 6 is a curve depicting the torque transmission and angular travel relationship of the damper shown in FIG. 4.

The torque converter and lock-up clutch shown in FIG. 4 is quite similar to that shown in FIG. 1 with the exception that the damper utilized torsion springs 108, 110 and 112. Thus, the torque converter and input drive components and the torque converter output shaft have been given the same numerical designation. As can be seen in FIG. 4, the inner hub of the turbine 20 has formed thereon a plurality of slots such as 100 which are engaged by the ends 102, 104 and 106 of torsion springs 108, 110 and 112 respectively. The clutch has a pressure plate 114 which is quite similar to clutch plate 38 and includes a friction surface 40. A spring retainer plate 116 is secured to pressure plate 114 and has slots 118, 120 and 122 formed therein, which slots are adapted to receive the ends 124, 126 and 128 of springs 108, 110 and 112 respectively. As can be seen in FIG. 5, the slot 118 is sufficiently narrow to trap the end of spring 108. The slot 120 is wider permitting some relative movement between the plate 116 and the spring end 126 while the end slot 122 is wider yet to permit more angular travel before the spring end 128 engages the slot to provide a drive connection. Thus the damper shown in FIG. 4 will provide a curve similar to that shown in FIG. 2 above and as can be seen in FIG. 6. The turbine 20 is secured to a hollow shaft 130 which in turn is splined to the torque converter output shaft 32. When the clutch is engaged, the spring 108 will be loaded to transmit torque from the spring retainer plate 116 to the turbine 20 and the output shaft 32. After the spring 108 has been loaded sufficiently so that the clutch plate moves angularly relative to the turbine a sufficient amount to permit the end 126 of spring 110 to engage the plate 116 the drive will be transmitted by both springs 108 and 110. Further angular relative movement between the clutch plate and the turbine will permit the spring 112 to pick up and transmit a portion of the torque.

Figure 7:
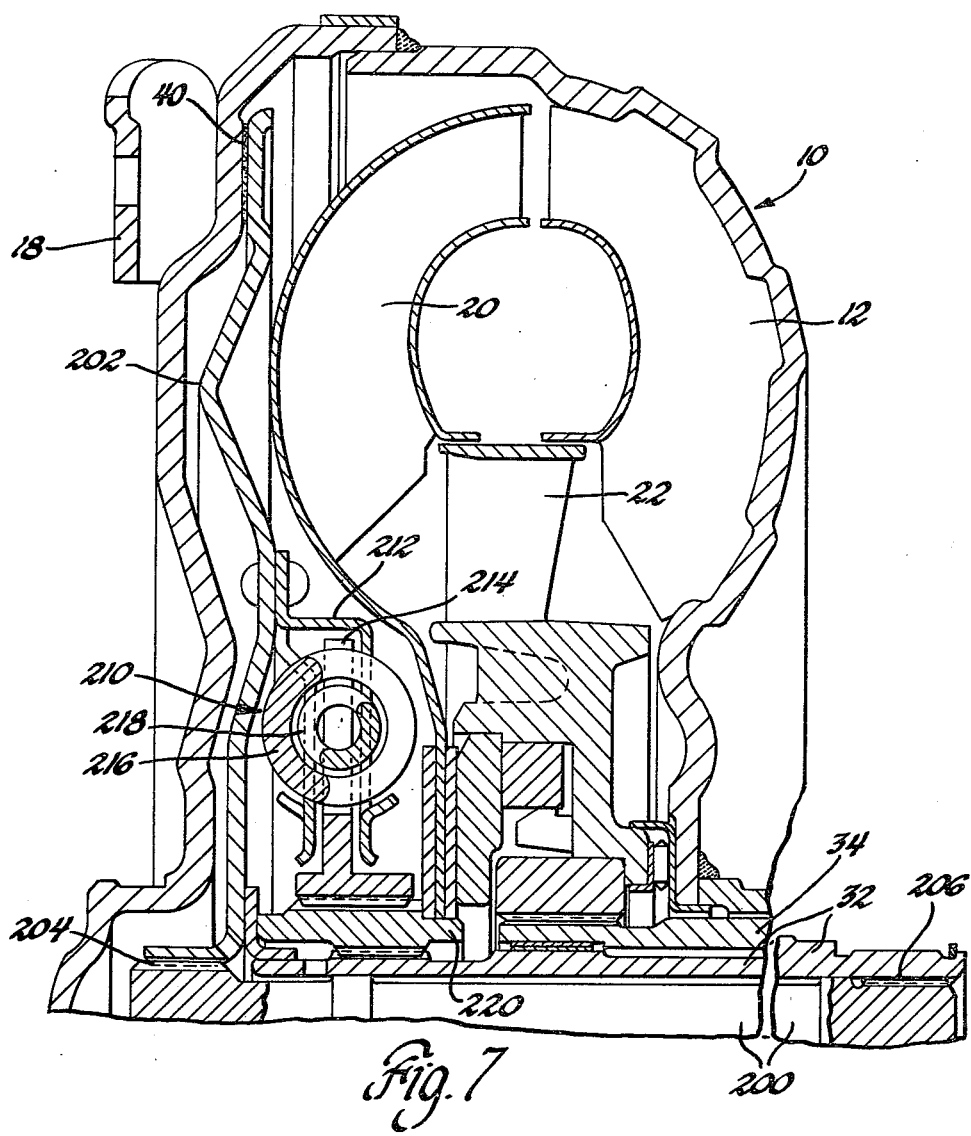
FIG. 7 is a cross-sectional side elevational view of a third embodiment of the vibration damper.
Figure 8:
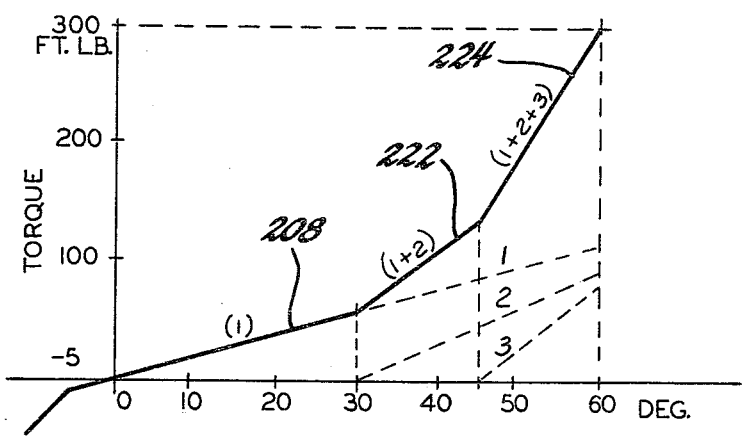
FIG. 8 is a curve showing the torque transmission and angular deflection relationship of the vibration damper shown in FIG. 7.

The torque converter and lock-up clutch shown in FIG. 7 is similar to the torque converter and lock-up clutch combination shown in FIGS. 1 and 4, with the exception that the primary spring is a torsion bar 200 which is disposed between the clutch plate 202 and the output shaft 32. The torsion bar 200 is splined to the clutch plate 202 at 204 and is splined to the output shaft 32 at 206. When the clutch is engaged, the torsion bar transmits torque from the clutch to the output shaft 32. During the transmission of torque the torsion bar permits angular relative displacement between the clutch plate and the turbine along curve 208, as seen in FIG. 8. The clutch has incorporated a secondary damper generally designated 210 which is similar in construction to the damper 62 shown in FIG. 1. The damper 210 has a spring housing 212 and a hub 214 between which are disposed a plurality of sets of coil springs 216 and 218. The hub 214 is splined to a drive transmitting member 220 which in turn is splined to the output shaft 32 and secured to the turbine 20. The spline connection between the hub 214 and the drive member 220 is similar to the drive connection shown in FIG. 3. That is, there is a very loose spline connection permitting relative angular movement between the spline teeth before the damper 210 is required to transmit torque. After a predetermined amount of torque is transmitted by the torsion bar 200 the springs 216 will be compressed between the spring housing 212 and hub 214 to cause a change in the damper curve from 208 to 222. Further angular excursion of the damper will result in the curve shown at 224. The damper shown in FIG. 7 could, of course, use three nested springs instead of two as shown. The torsion bar 200 permits a wider angle of primary spring travel before the pick up of the secondary spring within the damper.

As can be seen from the curves in FIGS. 2, 6 and 8, the dampers described above permit a substantially wide angle travel between the input and output of the clutch members. This wide angle of travel is highly desireable in torque converter lock-up clutches, as previously explained, since it permits large and rapid angular changes between the engine and transmission to provide smooth torque transmission such that the presence of the lock-up clutch is not felt. That is the lock-up clutch, with these wide angles of excursion, responds significantly the same as a conventional torque converter, without the slip loss which accompanies a torque converter.

Obviously, many modifications and variations of the present invention are possible in light of the above teaching. It is therefore to be understood, that within the scope of the appended claims the invention may be practiced otherwise than as specifically described.

What is claimed is:

1. A torque converter, lock-up clutch and damper assembly comprising; input means adapted to be driven by a power source which delivers usable output torque and undesireable torsional vibrations, said input means including input shell and an impeller; output means including a turbine and an output shaft, said turbine being continuously drivingly connected to said output shaft and cooperating with said impeller to provide a fluid drive which isolates said torsional vibrations; a lock-up clutch including a single plate clutch member selectively frictionally engageable with said input shell for receiving torque therefrom in drive bypassing relation with said fluid drive; and multiple stage torsional vibration damper means disposed between said single plate clutch member and said output means for permitting relative angular oscillations between said clutch member and said output means caused by said torsional vibrations, said vibration damper means including primary spring means comprising a spring housing secured to said turbine adjacent the outer periphery thereof and having spring abutting surfaces thereon, spring fingers secured to said single plate clutch member extending intermediate said spring abutting surfaces, and compression spring means disposed in said spring housing extending circumferentially between said spring abutting surfaces and being compressible by said spring abutting surfaces and said spring fingers to transmit torque from said single plate clutch member to said turbine upon relative movement between said spring abutting surfaces and said spring fingers and second spring means spaced radially from said primary spring means and connected in parallel drive relation therewith, said primary spring means being capable of transmitting only a part of said output torque and being continuously drivingly connected between said clutch member and said output means for permitting said relative angular oscillations at all times when said lock-up clutch is engaged, and after a predetermined amount of relative angular movement between said clutch member and said output means, said second spring means becoming drivingly connected between said clutch member and said output means and being capable of transmitting the remainder of said output torque.

2. A torque converter, lock-up clutch and damper assembly comprising; input means adapted to be driven by a power source which delivers usable output torque and undesirable torsional vibrations, said input means including input shell and an impeller; output means including a turbine and an output shaft, said turbine being continuously drivingly connected to said output shaft and cooperating with said impeller to provide a fluid drive which isolates said torsional vibrations; a lock-up clutch including a single plate clutch member selectively frictionally engageable with said input sheel for receiving torque therefrom in drive bypassing relation with said fluid drive; multiple stage torsional vibration damper means disposed between said single plate clutch member and said output means for permitting relative angular oscillations between said clutch member and said output means caused by said torsional vibrations, said vibration damper means including primary spring means comprising a torsion bar concentric with said output shaft and having one end drivingly connected to said single plate clutch member and the other end drivingly connected to said output shaft, and second spring means spaced radially from said primary spring means and connected in parallel drive relation therewith, said primary spring means being capable of transmitting only a part of said output torque and being continuously drivingly connected between said clutch member and said output means for permitting said relative angular oscillations at all times when said lock-up clutch is engaged, and after a predetermined amount of relative angular movement between said clutch member and said output means, said second spring means becoming drivingly connected between said clutch member and said output means and being capable of transmitting the remainder of said output torque; and lost motion drive transmitting means disposed between said second spring means and said turbine for permitting the predetermined relative angular movement prior to the second spring means becoming functional.

3. A torque converter, lock-up clutch and damper assembly comprising; input means adapted to be driven by a power source which delivers usable output torque and undesirable torsional vibrations, said input means including input shell and an impeller; output means including a turbine and an output shaft, said turbine being continuously drivingly connected to said output shaft and cooperating with said impeller to provide a fluid drive which isolates said torsional vibrations; a lock-up clutch including a single plate clutch member selectively frictionally engageable with said input shell for receiving torque therefrom in drive bypassing relation with said fluid drive; and multiple stage torsional vibration damper means disposed between said single plate clutch member and said output means for permitting relative angular oscillations between said clutch member and said output means caused by said torsional vibrations, said vibration damper means including primary spring means comprising torsional spring means having one end continuously drivingly connected with said single plate clutch member and the other end continuously drivingly connected with said turbine, and second spring means comprising torsional spring means spaced radially from and fully encircled by said primary spring means and connected in parallel drive relation therewith and having one end continuously drivingly connected with said turbine and the other end being drivingly connected with said single plate clutch member only after a predetermined torque is transmitted by said primary spring means, said primary spring means being capable of transmitting only a part of said output torque and being continuously drivingly connected between said clutch member and said output means for permitting said relative angular oscillations at all times when said lock-up clutch is engaged, and after a predetermined amount of relative angular movement between said clutch member and said output means, said second spring means becoming drivingly connected between said clutch member and said output means and being capable of transmitting the remainder of said output torque.

* * * * *